(12) United States Patent
Zentz

(10) Patent No.: US 12,232,442 B2
(45) Date of Patent: Feb. 25, 2025

(54) AGRICULTURAL MOWER CONDITIONER WITH ODD NUMBER OF CUTTING DISCS

(71) Applicant: CNH Industrial America LLC, New Holland, PA (US)

(72) Inventor: Duane A. Zentz, Lititz, PA (US)

(73) Assignee: CNH Industrial America LLC, Holland, PA (US)

( * ) Notice: Subject to any disclaimer, the term of this patent is extended or adjusted under 35 U.S.C. 154(b) by 441 days.

(21) Appl. No.: 17/652,186

(22) Filed: Feb. 23, 2022

(65) Prior Publication Data
US 2023/0263094 A1    Aug. 24, 2023

(51) Int. Cl.
*A01D 34/66*    (2006.01)
*A01D 43/10*    (2006.01)

(52) U.S. Cl.
CPC ........... *A01D 34/664* (2013.01); *A01D 43/10* (2013.01)

(58) Field of Classification Search
CPC ....... A01D 57/30; A01D 34/664; A01D 43/10
See application file for complete search history.

(56) References Cited

U.S. PATENT DOCUMENTS

| | | | |
|---|---|---|---|
| 4,727,711 A * | 3/1988 | Quataert | A01D 34/661 56/192 |
| 4,986,061 A * | 1/1991 | Frumholtz | A01D 34/664 56/320.1 |
| 5,852,921 A * | 12/1998 | Neuerburg | A01D 57/30 56/153 |
| 5,943,848 A * | 8/1999 | Rice | A01D 34/664 56/16.4 B |
| 6,421,994 B1 * | 7/2002 | Boucher | A01D 57/28 56/192 |
| 8,161,719 B2 | 4/2012 | Barnett et al. | |
| 8,800,254 B2 | 8/2014 | Stephenson et al. | |
| 8,959,881 B2 | 2/2015 | Barnett et al. | |
| 9,861,036 B2 | 1/2018 | Totten et al. | |
| 10,582,659 B2 * | 3/2020 | Fay, II | A01D 43/006 |
| 2004/0237489 A1 * | 12/2004 | Neuerburg | A01D 34/664 56/6 |
| 2011/0029909 A1 * | 2/2011 | Matousek | A01F 15/10 715/771 |
| 2014/0083071 A1 * | 3/2014 | Fay, II | A01D 45/00 56/14.7 |
| 2017/0251595 A1 * | 9/2017 | Stephenson | A01D 34/76 |
| 2017/0347524 A1 * | 12/2017 | Wilhelm | A01D 34/664 |
| 2018/0116115 A1 * | 5/2018 | Rotole | A01D 57/30 |
| 2019/0373809 A1 * | 12/2019 | Fay, II | A01D 34/664 |
| 2023/0200295 A1 * | 6/2023 | Shonk | A01D 43/006 56/15.6 |

* cited by examiner

*Primary Examiner* — Abigail A Risic
(74) *Attorney, Agent, or Firm* — Peter K. Zacharias; Rebecca L. Henkel; Rickard K. DeMille

(57) ABSTRACT

An agricultural mower conditioner includes: a frame including a tongue coupler and defining a frame width; a cutter bar including an odd number of cutting discs arranged side-by-side across a cutter bar width; and a conditioning roll carried behind the cutter bar, the conditioning roll being offset with respect to a centerline that bisects the frame width and the cutter bar width.

16 Claims, 3 Drawing Sheets

AGRICULTURAL MOWER CONDITIONER WITH ODD NUMBER OF CUTTING DISCS

FIELD OF THE INVENTION

The present invention pertains to agricultural vehicles and, more specifically, to agricultural mower conditioners.

BACKGROUND OF THE INVENTION

Mowers and mower-conditioners are often employed to cut hay and/or other standing plants, such as grass, in a field. A typical mower system includes a towing vehicle, which may be a tractor or similar vehicle, that pulls a mower and/or mower-conditioner.

Many mower systems utilize so-called "offset" mowers or mower-conditioners where the mower or mower-conditioner is not carried directly behind the towing vehicle, i.e. a centerline of the mower or mower-conditioner is parallel but offset from a centerline of the towing vehicle. The mower or mower-conditioner is coupled to the towing vehicle by a pivotable tongue.

While mowers and mower-conditioners both include a cutter bar with cutting elements, which may be in the form of rotating cutting discs, mower-conditioners also include a conditioning element, such as a conditioning roll. The conditioning roll is disposed behind the cutting discs and conditions cut crop material, e.g., by crushing the stems of the cut crop material, before the crop material is arranged in a windrow. Conditioning rolls are generally effective but should condition most of the cut crop material to ensure homogeneity of crop material in the windrow.

What is needed in the art is a way to condition most of the crop material cut by a mower-conditioner.

SUMMARY OF THE INVENTION

Exemplary embodiments disclosed herein provide an agricultural mower conditioner with a cutter bar including an odd number of cutting discs and a conditioning roll that is offset with respect to a centerline.

In some exemplary embodiments provided according to the present disclosure, an agricultural mower conditioner includes: a frame including a tongue coupler and defining a frame width; a cutter bar including an odd number of cutting discs arranged side-by-side across a cutter bar width; and a conditioning roll carried behind the cutter bar, the conditioning roll being offset with respect to a centerline that bisects the frame width and the cutter bar width.

In some exemplary embodiments provided according to the present disclosure, an agricultural mower conditioner system includes: a towing vehicle including: a chassis; an engine carried by the chassis; and a tongue carried by the chassis; and an agricultural mower conditioner including: a frame defining a frame width and including a tongue coupler coupled to the tongue; a cutter bar including an odd number of cutting discs arranged side-by-side across a cutter bar width; and a conditioning roll carried behind the cutter bar, the conditioning roll being offset with respect to a centerline that bisects the frame width and the cutter bar width.

One possible advantage that may be realized by exemplary embodiments disclosed herein is that the conditioning roll being offset relative to the centerline can condition most of the crop material cut by the cutting discs even when there are an odd number of cutting discs.

Another possible advantage that may be realized by exemplary embodiments disclosed herein is that only one of the cutting discs may need to co-rotate with an adjacent cutting disc to effectively feed cut crop material to the conditioning roll.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
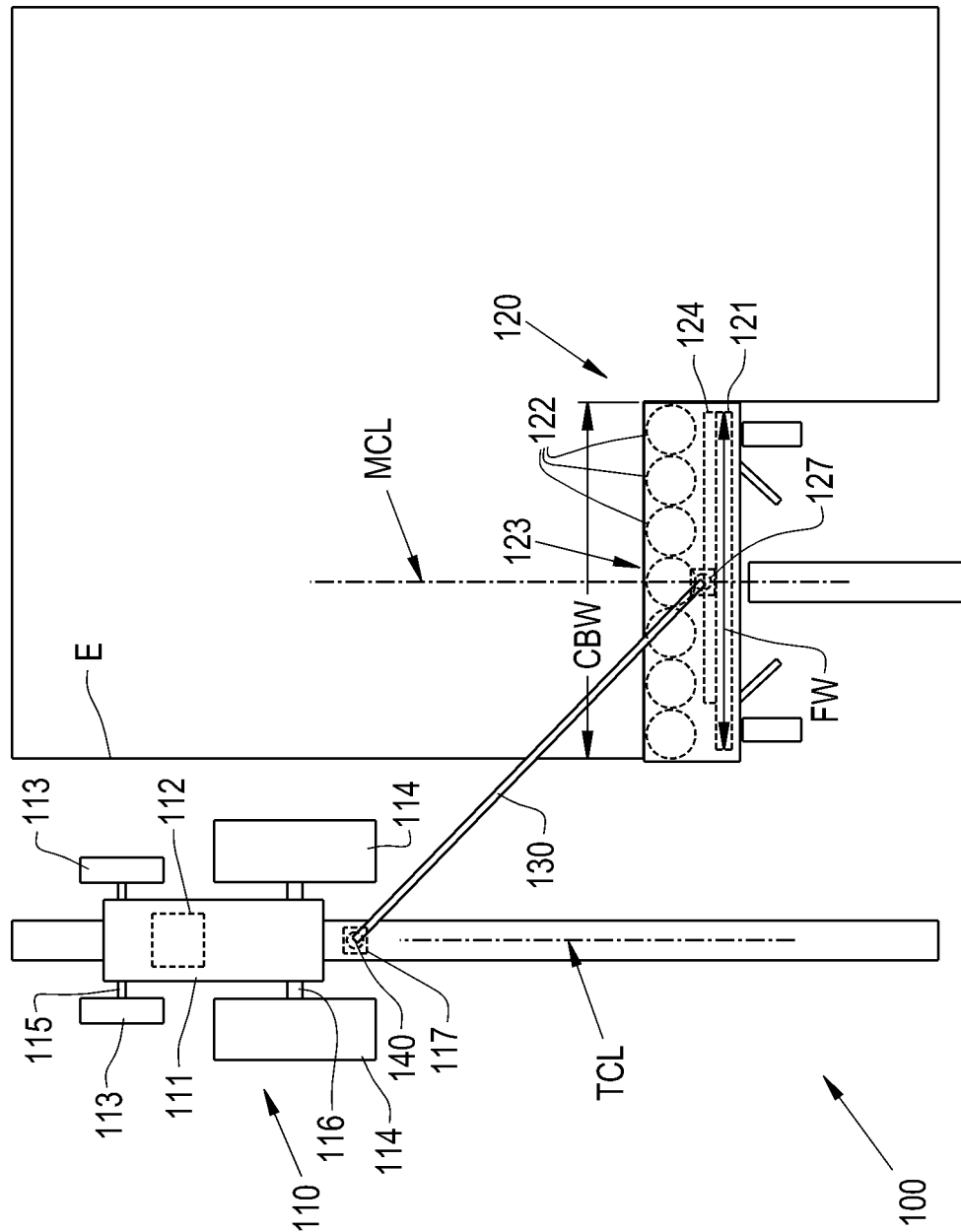
FIG. 1 illustrates a top view of an exemplary embodiment of an agricultural mower conditioner system provided according to the present disclosure while a towing vehicle and a mower conditioner of the system are traveling through a field.

Referring now to the drawings, and more particularly to FIG. 1, an exemplary embodiment of an agricultural mower system 100 including a towing vehicle 110 and a mower conditioner 120 is illustrated. The towing vehicle 110 includes a chassis 111 and an engine, such as an internal combustion engine (ICE) 112, to provide motive force to a plurality of wheels 113, 114. Some of the wheels, such as front wheels 113, may be coupled to the chassis 111 by a steerable front axle 115 while the rear wheels 114 are coupled to the chassis 111 by a fixed rear axle 116. It should be appreciated that, alternatively, the front axle 115 may be a fixed axle and/or the rear axle 116 may be a steerable axle. The towing vehicle 110 includes a tongue coupler 117 to which a tongue 130 is pivotably coupled, as will be described further herein. The towing vehicle 110 defines a towing centerline TCL. As illustrated, the towing vehicle 110 is in the form of a tractor, but it should be appreciated that the towing vehicle 110 may be other types of vehicles.

The mower conditioner 120 includes a frame 121 and a cutter bar 123 that includes an odd number of cutting discs 122 arranged side-by-side across a cutter bar width CBW. The frame 121 defines a frame width FW and includes a tongue coupler 127 that is pivotably coupled to the tongue 130, which is pivotably coupled to the tongue coupler 117 of the towing vehicle 110. The mower conditioner 120 defines a mower conditioner centerline MCL that bisects the cutter bar width CBW and the frame width FW and is offset from the towing centerline TCL, as illustrated, so the mower centerline MCL is not coaxial with the towing centerline TCL. The mower conditioner centerline MCL may also extend through the tongue coupler 127. The frame 121 may be what is referred to as a "trail frame" that is adjacent to a rear of the mower conditioner 120. A conditioning roll 124 is carried by the frame 121 behind the cutter bar 123 so the conditioning roll 124 can condition crop material cut by the cutting discs 122. As the mower conditioner 120 is carried along an edge E of standing crops, the mower conditioner 120 cuts crops with the cutting discs 122, conditions the cut crop material with the conditioning roll 124, and directs the cut and conditioned crop material into a windrow behind the mower conditioner 120.

In known mower conditioner systems, the cutter bar may include an even number of cutting discs. The cutting discs generally are provided as counter-rotating pairs so the cutting discs all rotate in a rotation direction that is opposite to the rotation direction of an adjacent cutting disc. The counter-rotating cutting discs not only cut the crop material but also help convey the crop material toward the conditioning roll. There is also demand for cutter bars that have an odd number of cutting discs. Each cutting disc having a corresponding counter-rotating cutting disc is not possible in mower conditioner systems having an odd number of cutting discs because at least one of the cutting discs will necessarily be unpaired. It has been found that there can be cutting performance issues with co-rotating discs, so minimizing the number of co-rotating discs can reduce the risk of there being cutting performance issues. It can also be expensive to manufacture conditioning rolls that are specifically sized—especially in the width direction—for mower conditioners with an even or odd number of cutting discs because producing lower numbers of a specific size can eliminate the economies of scale compared to a more universal size that can be used in multiple configurations.

Figure 2:
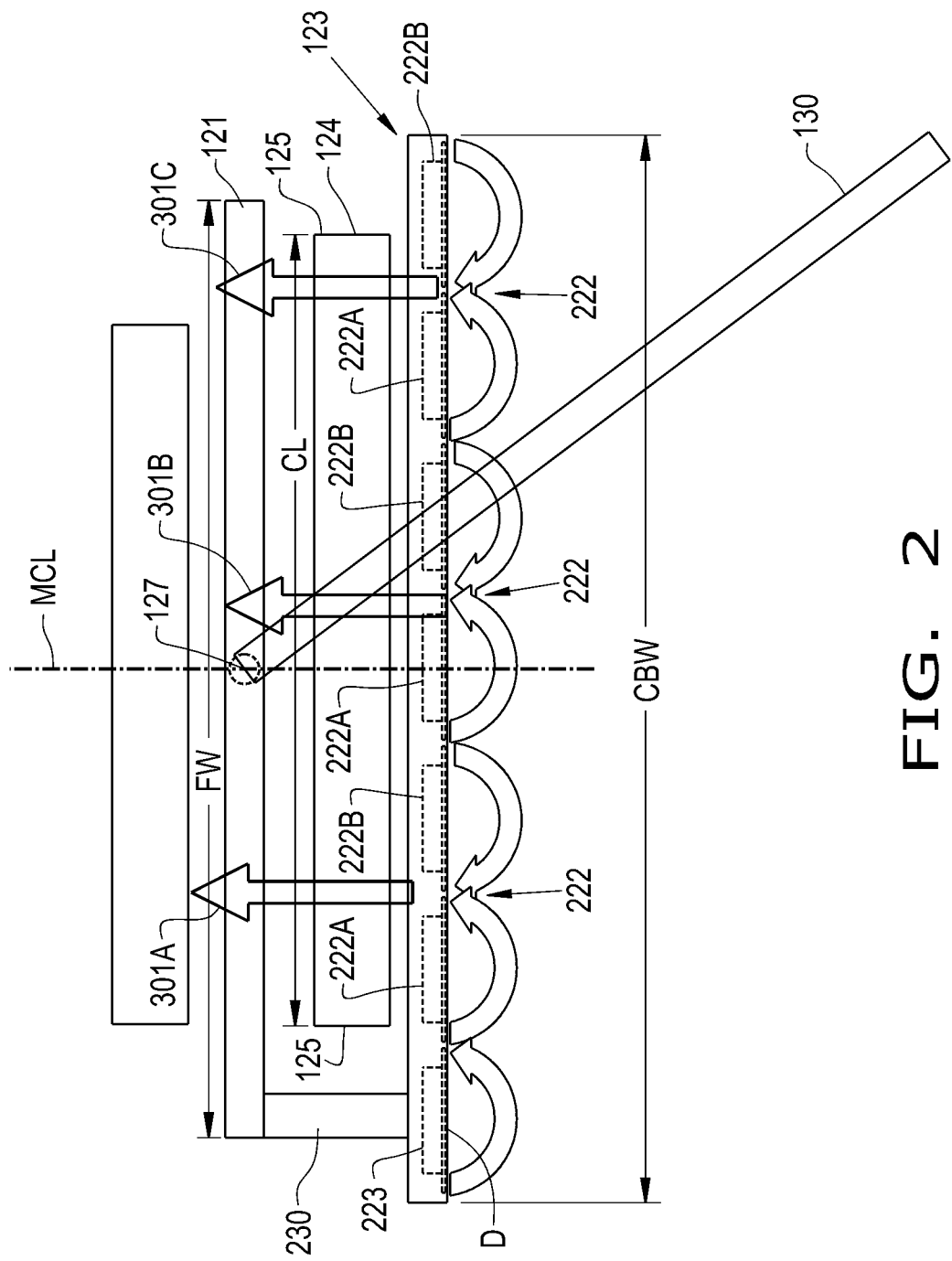
FIG. 2 illustrates a schematic view of the agricultural mower conditioner of FIG. 1.
Figure 3:
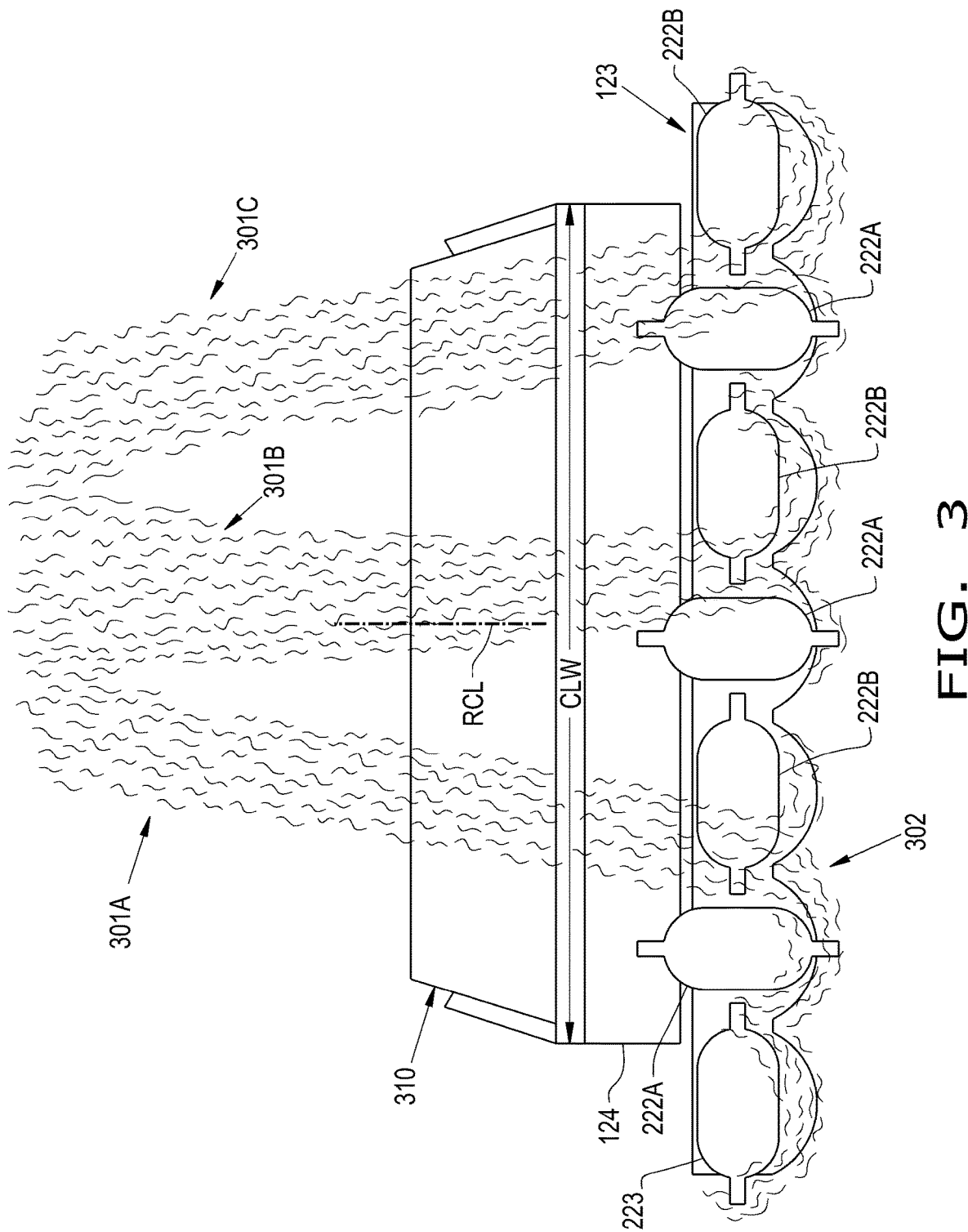
FIG. 3 illustrates a schematic view of the agricultural mower conditioner of FIGS. 1-2 with crop material flowing through the mower conditioner.

To address some of the previously described issues, and referring now to FIGS. 2 and 3 as well, the conditioning roll 124 is offset with respect to the mower conditioner centerline MCL that bisects the cutter bar width CBW and the frame width FW so differing lengths of the conditioning roll 124 are on opposite sides of the mower conditioner centerline MCL. In other words, the conditioning roll 124 is not centered with respect to the mower conditioner centerline MCL, as opposed to the frame 121 and the cutter bar 123 that are centered with respect to the mower conditioner centerline MCL. It should be appreciated that while one conditioning roll 124 can be seen in the drawings, one or more additional conditioning rolls that are similar to the conditioning roll 124 may be placed adjacent to the conditioning roll 124, e.g., directly above or below, to form a conditioner with multiple conditioning rolls.

As illustrated specifically in FIG. 2, it can be seen that the cutting discs 122 include at least one pair of counter-rotating discs 222, illustrated as three pairs of counter-rotating discs 222, including a counter-clockwise rotating cutting disc 222A and a clockwise rotating cutting disc 222B adjacent to the counter-clockwise rotating cutting disc 222A. At least one co-rotating cutting disc, illustrated as a single co-rotating cutting disc 223 that co-rotates with respect to its adjacent cutting disc 222A, is also provided. As used herein, the "co-rotating" cutting disc 223 co-rotates with respect to its adjacent cutting disc 222A in the sense that the co-rotating cutting discs 222A, 223 rotate in the same direction, e.g., counter-clockwise as illustrated. It should be appreciated that while the co-rotating cutting discs 222A, 223 are illustrated and described as rotating counter-clockwise, one or more cutting discs can also co-rotate with its adjacent cutting disc in the clockwise direction. A gearbox 230 may be provided to rotate one or more of the cutting discs 222A, 222B, 223, either directly or indirectly.

The co-rotating cutting disc 223 may be an outermost disc, as illustrated, so the co-rotating cutting disc 223 is only adjacent to a single other cutting disc 222A, which reduces the number of co-rotating cutting discs to a minimum. It should be appreciated that, in some embodiments, one or more co-rotating cutting discs may be provided that are adjacent to two other cutting discs, which may both rotate in the same direction as the co-rotating cutting disc. In some embodiments, the at least one co-rotating cutting disc 223 consists of a single co-rotating cutting disc 223 so there is only one cutting disc that co-rotates with an adjacent cutting disc but does not counter-rotate with another adjacent cutting disc.

In some embodiments, the conditioning roll 124 does not overlap with the co-rotating cutting disc 223, which is best illustrated in FIG. 2 with a diameter D of the co-rotating cutting disc 223 not overlapping either lateral end 125 of the conditioning roll 124 in a direction of the mower conditioner centerline MCL. On the other hand, the conditioning roll 124 may overlap with all of the counter-rotating cutting discs 222A, 222B, i.e., the conditioning roll 124 overlaps with all of the cutting discs 222A, 222B except for the co-rotating cutting disc 223. Each of the counter-rotating cutting discs 222A, 222B may define the same diameter D as the co-rotating cutting disc 223. In this respect, the conditioning roll 124 may define a conditioner length CL that is less than the sum of the diameters D of the cutting discs 222A, 222B, i.e., 6*D. It should thus be appreciated that the conditioning roll 124 may define a conditioner length CL that is less than (N−1)*D, where N is the number of cutting discs 222A, 222B, 223 all having the same diameter D, so the conditioning roll 124 is relatively short in comparison to the sum of the diameters D of the cutting discs 222A, 222B, 223 and more akin to the length of a comparable conditioning roll provided for a cutter bar with a smaller, even number of cutting discs. In some embodiments, the conditioner length CL may be greater than (N−2)*D and less than (N−1)*D.

Referring specifically to FIG. 3, a flow of crop material through the mower conditioner 120 is illustrated in greater detail. As can be seen, the flow of crop material starts at the front of the mower conditioner 120, i.e., adjacent the cutter bar 123, and flows behind the cutter bar 123 and the conditioning roll 124 as three distinct crop streams 301A, 301B, 301C. The three crop streams 301A, 301B, 301C each generally correspond to one of the pairs of counter-rotating cutting discs 222A, 222B, which is indicative that the counter-rotation of the paired cutting discs 222A, 222B cuts crop material and directs the crop material in a respective crop stream 301A, 301B, 301C to the conditioning roll 124. However, it has been found that the flow of crop material from the co-rotating cutting disc 223, which may not overlap with the conditioning roll 124, is entrained in the flow of crop material from the adjacent pair of counter-rotating cutting discs 222A, 222B. In this respect, the crop material cut by the co-rotating cutting disc 223 is being cut and then moved towards the adjacent cutting disc 222A, resulting in a region of heavy crop material flow 302 between the cutting disc 222A and its counter-rotating cutting disc 222B. The region of heavy crop material flow 302 results due to the crop material cut by the co-rotating cutting disc 223 being mixed in with the crop material cut by the counter-rotating cutting discs 222A, 222B, with the counter-rotating cutting discs 222A, 222B conveying the mixed crop material flows towards the conditioning roll 124. Since the co-rotating cutting disc 223 tends to move little crop material directly past itself, the conditioning roll 124 not overlapping the co-rotating cutting disc 223 results in a small percentage of cut crop material being unconditioned. Rather, the majority of the crop material cut by the co-rotating cutting disc 223 is moved by the adjacent cutting disc 222A and its paired counter-rotating cutting disc 222B to the conditioning roll 124 before being windrowed behind the mower conditioner 120. Thus, offsetting the conditioning roll 124 surprisingly results in little cut crop material being unconditioned before exiting the mower conditioner 120.

In some embodiments, the mower conditioner 120 also includes a deflector 310 that is disposed behind the conditioning roll 124 and configured to deflect crop material that has been conditioned by the conditioning roll 124. For example, the crop streams 301A, 301B, 301C may be deflected by the deflector 310 to form one or more windrows. The deflector 310 may be pivotable to a variety of deflecting positions. Similarly to the conditioning roll 124, the deflector 310 may be offset with respect to the mower conditioner centerline MCL. However, the deflector 310 may be centered with respect to a roll centerline RCL bisecting the conditioner length CL of the conditioning roll 124, as illustrated. The deflector 310 can thus be provided to help form uniform windrows.

From the foregoing, it should be appreciated that the mower conditioner 120 provided according to the present disclosure includes a conditioning roll 124 that is offset relative to the mower conditioner centerline MCL. Offsetting the conditioning roll 124 allows the mower conditioner 120 to utilize a conditioning roll 124 that is relatively short, compared to a similar conditioning roll for a smaller, even number of cutting discs, but still effective to condition most of the crop material cut by the cutter bar 123. If the cutter bar 123 has seven cutter discs 122, 222A, 222B, 223, for example, the conditioning roll 124 may be sized to effectively work in a mower conditioner having six counter-rotating cutting discs without offsetting the conditioning roll 124 and also effectively work in the mower conditioner 120 with seven cutting discs 122, 222A, 222B, 223 when offset. Thus, offsetting the conditioning roll 124 according to the present disclosure can reduce the cost of producing the mower conditioner 120 with an odd number of cutting discs 122, 222A, 222B, 223 by allowing the conditioning roll 124 to be sized for interchangeable use in a cutter bar with an even number of cutting discs to take advantage of economies of scale.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural mower conditioner, comprising:
a frame comprising a tongue coupler and defining a frame width;
a cutter bar comprising an odd number of cutting discs arranged side-by-side across a cutter bar width including a first cutting disc on a first end of the cutter bar and a second cutting disc on a second end of the cutter bar; and
a conditioning roll carried behind the cutter bar, the conditioning roll being offset with respect to a centerline that bisects the frame width and the cutter bar width, the conditioning roll overlapping with all of the cutting discs except for the first cutting disc on the first end of the cutter bar.

2. The agricultural mower conditioner of claim 1, wherein the odd number of cutting discs comprises at least one pair of adjacent counter-rotating cutting discs and at least one co-rotating cutting disc that co-rotates with respect to its adjacent cutting disc.

3. The agricultural mower conditioner of claim 2, wherein the at least one co-rotating cutting disc is an outermost cutting disc.

4. The agricultural mower conditioner of claim 3, where in the at least one co-rotating cutting disc is the first cutting disc and wherein the conditioning roll does not overlap with the at least one co-rotating cutting disc.

5. The agricultural mower conditioner of claim 4, wherein the conditioning roll overlaps with all of the cutting discs except for the at least one co-rotating cutting disc.

6. The agricultural mower conditioner of claim 2, wherein the at least one co-rotating cutting disc is the first cutting disc.

7. The agricultural mower conditioner of claim 1, wherein the odd number of cutting discs comprises seven cutting discs.

8. The agricultural mower conditioner of claim 1, wherein each of the cutting discs defines a same diameter (D), wherein a conditioner length of the conditioning roll is less than $(N-1)*D$ and greater than $N-2*D$, wherein N is a number of the cutting discs.

9. An agricultural mower conditioner system, comprising:
a towing vehicle comprising:
a chassis;
an engine carried by the chassis; and
a tongue carried by the chassis; and
an agricultural mower conditioner comprising:
a frame defining a frame width and comprising a tongue coupler coupled to the tongue;
a cutter bar comprising an odd number of cutting discs arranged side-by-side across a cutter bar width including a first cutting disc on a first end of the cutter bar and a second cutting disc on a second end of the cutter bar; and
a conditioning roll carried behind the cutter bar, the conditioning roll being offset with respect to a centerline that bisects the frame width and the cutter bar width, the conditioning roll overlapping with all of the cutting discs except for the first cutting discs on the first end of the cutter bar.

10. The agricultural mower conditioner system of claim 9, wherein the odd number of cutting discs comprises at least one pair of adjacent counter-rotating cutting discs and at least one co-rotating cutting disc that co-rotates with respect to its adjacent cutting disc.

11. The agricultural mower conditioner system of claim 10, wherein the at least one co-rotating cutting disc is an outermost cutting disc.

12. The agricultural mower conditioner system of claim 11, wherein the at least one co-rotating cutting disc is the first cutting disc and wherein the conditioning roll does not overlap with the at least one co-rotating cutting disc.

13. The agricultural mower conditioner system of claim 12, wherein the conditioning roll overlaps with all of the cutting discs except for the at least one co-rotating cutting disc.

14. The agricultural mower conditioner system of claim 10, wherein the at least one co-rotating cutting disc consists of the first cutting disc.

15. The agricultural mower conditioner system of claim 9, wherein the odd number of cutting discs comprises seven cutting discs.

16. The agricultural mower conditioner system of claim 9, wherein each of the cutting discs defines a same diameter (D), wherein a conditioner length of the conditioning roll is less than (N−1)*D and greater than (N−2)*D, wherein N is a number of the cutting discs.

* * * * *